Patented June 24, 1941

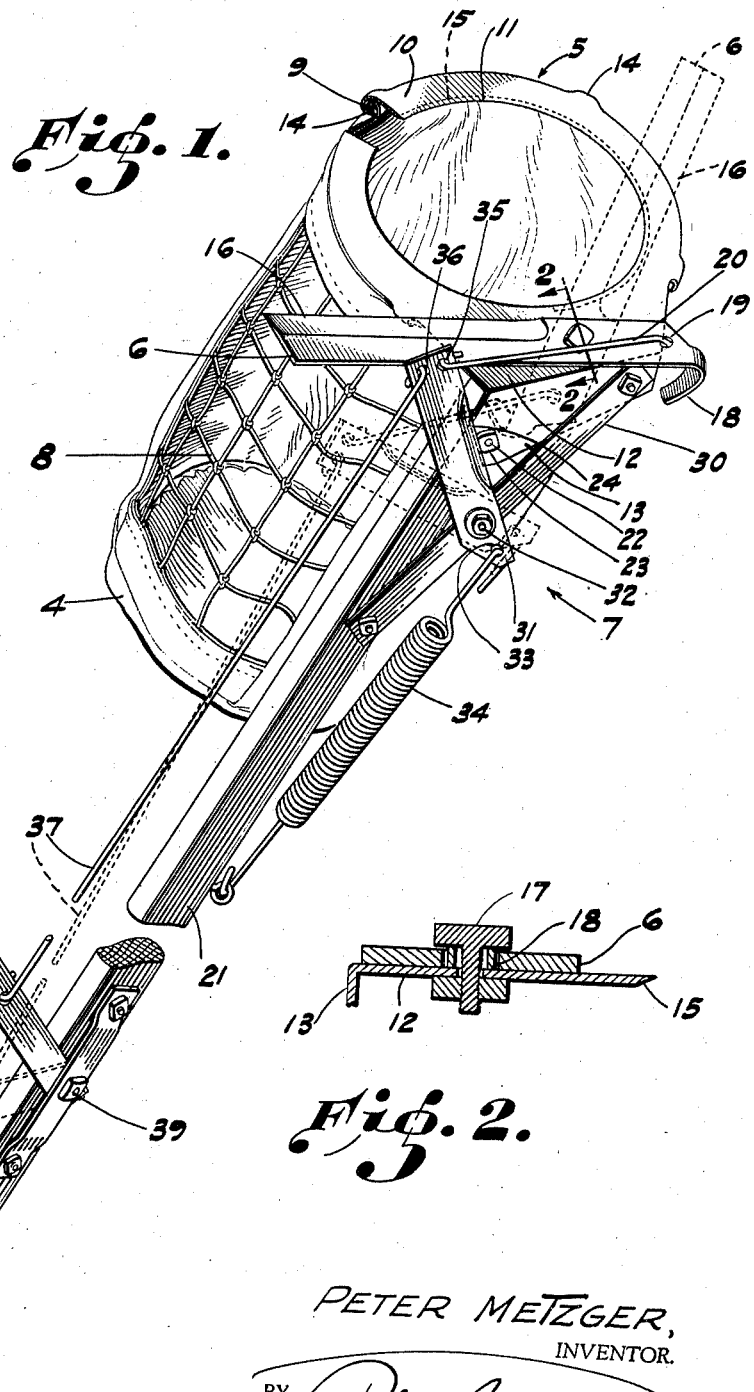

2,246,747

UNITED STATES PATENT OFFICE 2,246,747

FRUIT CLIPPER

Peter Metzger, Anaheim, Calif.

Application July 15, 1940, Serial No. 345,504

9 Claims. (Cl. 56—335)

This invention relates to improvements in fruit clipping devices particularly adapted for clipping and catching fruit remotely situated in trees by workmen operating from the ground.

Important objects of the invention are to improve upon the sack for catching the severed fruit, and the mouth-piece for maintaining the mouth of the sack open; to improve upon the cutting means for severing the stem of the fruit, and the means whereby the cutting means is operated; and to in general simplify and facilitate the operation of clipping fruit; contribute to the preservation of life and limb, and afford greater protection to trees having branches fragile, easily broken and likely to be caught between the cutting elements and thus become severed or bruised.

In picking certain classes of fruit it is necessary that they be not bruised. The limbs of trees of other classes of fruit are fragile and easily broken and the soil under them is usually maintained in a loosely tilled fashion and is of uneven terrain. The limbs of the avocado tree, in particular, are so fragile it is not safe to place a ladder against them. Neither is the earth thereunder firm enough to stabilize a step ladder against tilting and thereby endangering the lives of workmen employed in picking this character of fruit, neither will the step ladder maintain the picker high enough to pick the fruit in the top branches.

It is, therefore, a still further object of the invention to provide a fruit clipping device which will offset these disadvantages.

With the foregoing and other objects in view, the invention resides in the novel arrangement and combination of parts and in the details of construction hereinafter described and claimed, it being understood that changes in the precise embodiment of the invention herein disclosed may be made, within the scope of that which is claimed, without departing from the spirit of the invention.

Referring to the accompanying drawing forming part of this specification—

Fig. 1 is a perspective view of my improved fruit clipper, some parts being broken away to economize space and also disclose underlying structures. A dotted indication in said view illustrates a working step.

Fig. 2 is a section taken on line 2—2 of Fig. 1.

Referring now in detail to the drawing, it will be seen the invention consists of four principal parts or combinations comprising a receptacle or sack 4 for catching the fruit which is clipped, a mouth-piece 5 for the sack, cutting means comprising a blade 6 for clipping the fruit, and means 7 for operating said blade.

The sack 4 is preferably constructed of canvas material, having in it facing the side at which the workman operates, a netting section 8. The netting thus being directed toward the operator will be prevented from becoming entangled with the branches when the sack is being thrust upwardly among them for the purpose of encircling the fruit incident to severing the stem thereof. The operator will be looking through the netting ascertain the correct location of the mouth-piece in relation to the stem in order not to clip the ends of any growing boughs or branches during the stem severing operation. Around the mouth of the sack is fastened a circular wire frame 9 about which the mouth portion of the sack is stitched for maintaining the mouth of the sack open.

The mouth-piece of the sack will be described next and may be said to consist of a flat ring-like steel plate 10 having a circular opening 11 lying superjacent the opening of the sack, and a tangential segment 12 extending off to one side of the ring-like part in the plane thereof, said segment terminating in a downwardly directed polygonal flange 13. At spaced points in the outer peripheral edge of the ring portion of the mouth-piece I provide downwardly and inwardly directed parts 14 whereby I secure detachably the frame wire of the sack to the mouth-piece. Part of the inner peripheral edge forming the opening 11 is beveled to provide a cutting edge to cooperate with the blade 6 as indicated by the numeral 15. Said bevel occupies about half the curvilinear edge of said opening and forms with the blade's edge a gradually diminishing segmental opening as the blade is advanced in the cutting or clipping operation. The function of this curvilinear cutting edge, which cooperates with the edge 16 of the knife blade to sever the stem of the fruit, will be understood more fully when the description pertaining to the operation is later read.

To the segment 12 I pivot the blade 6 by means of a bolt 17. A bushing 18 surrounds the bolt, and there is clearance between the hole in the blade and the outer diameter of the bushing, and the bushing is slightly longer than the thickness of the blade permitting the latter to move freely thereon without binding.

The cutting edge of the blade is directed toward said curvilinear blade edge and in its operative sweep between the limits of its swing, completely traverses the opening 11. The underside of the blade rests and rides on the upper surface of the ring. The blade is provided with a flange 18 laterally bent back upon itself which at the full limit of the blade's operative swing contacts the flange 13, as dottedly indicated, to stop it. Between said pivot and flange I provide a hole 19 for fastening one end of the operating rod 20 thereinto.

The mouth-piece 5 is attached to a pole 21 by means of the bolt 22 extending through the flange 13 and pole, and clamped thereto by the nut 23. The underside of the mouth-piece may rest upon the end of the pole for further stabilization and, for reasons hereinafter pointed out, the plane of the mouth-piece is slightly pitched in relation to the pole.

Additional support for the overhanging portion of the mouth-piece is also afforded through the medium of the diagonal brace 30 on which the lever 31, for actuating the blade 6, is pivotally mounted by means of the pivot pin 32, said brace 30 having one end rigidly fastened to said pole and the other end rigidly fastened to said polygonal flange 13.

Lever 31 has its lower end extending somewhat beyond the location of the pivot 32, and such end is provided with a hole 33 to which one of the spiral spring 34 is fastened, said spring having its other end suitably fastened to said pole. The spring maintains the blade 6 in the retracted position at which time the tapered edge 24 of the lever 31 engages the edge of the flange 13 or nut 23 to stop it.

Lever 31 has two holes, 35 and 36, at the end which is opposite said spring, hole 35 being utilized to fasten the end of rod 20 thereto and hole 36 being utilized to fasten the upper end of rod 37 thereto. Rod 37 extends downwardly to a point adjacent the end of the pole 21 and is fastened to the operating lever 38 pivoted to the pole at a point intermediate the lever's pivot point 39 and the handle 40 of said lever.

In the operation of the device, the end of the pole 21 is grasped with one hand while the other hand is utilized to assist in steadying the pole and operating the lever, or the pole may be supported by a carrying belt similarly to the manner in which flag poles are supported by parade walkers, whereby one hand is accessible for guiding the clipping device among the boughs of the tree to points from which the fruit pendently swing. On extending the fruit into the sack the correct location of the stem is gaged, in relation to the curvilinear edge of the ring, by gazing through the netting section; whereupon, by holding the pole with one hand, the other is free to operate the handle 40 whereby the knife blade is caused to move from the full line position to the dotted line position. With the plane of the ring pitched in relation to the pole, when the pole is extended at an angle with the vertical, the knife will operate in a horizontal plane.

When the edge of the blade bisects the opening where the curvilinear blade ends, there is formed a segmental opening in which the stem of the fruit hangs for clipping. As the travel of the knife increases, this opening is diminished and, during this diminishing of the opening, two things happen. The stem of the fruit is caused to travel across the curvilinear edge until the final clinch of the straight blade with the stem takes place. During this travel the edge of the straight blade has been performing a slicing action on the stem of the fruit so that, when the final clinch takes place, the stem of the fruit has become so weakened that no extra force is necessary to perform the severing operation. This operation is less irksome than with clippers wherein the stem is fed into the edges of the blades in scissor fashion. Spring 34 retracts blade 6 upon manual release of the handle 40. When the bag has been filled with fruit the pole is lowered and the bag is emptied, whereupon the operation of clipping may be continued.

What is claimed is:

1. In a fruit clipping device, a sack, a mouth-piece for the sack, said mouth-piece comprising a flat ring-like plate having a circular opening, a portion of which is chamfered to provide a curvilinear cutting edge, downwardly inturned lugs carried by said mouth-piece for fastening said sack thereto, a pole, said mouth-piece having a depending flange connected to said pole, a knife pivotally mounted upon said mouth-piece with the edge thereof directed toward the opening in said mouth-piece, and means for operating said blade forwardly and backwardly across the opening in said mouth-piece.

2. The subject matter of claim 1 and, said knife forming with said curvilinear edge a gradually diminishing segmental opening as the edge of the knife approaches said curvilinear edge.

3. The subject matter of claim 1 and, said knife blade having a lateral flange bent back upon itself engageable with the depending flange of said mouth-piece to limit the forward travel of said blade.

4. The subject matter of claim 1 and, said means for operating said knife comprising a manually operable hand lever pivoted to said pole, and intervening mechanism connecting said lever to said blade.

5. The subject matter of claim 1 and, said sack having a netting section directed toward the side of the device from which a workman operates.

6. In a device of the kind described, a sack, a mouth-piece for said sack, said mouth-piece comprising a flat ring-like plate having a circular opening extending therethrough, a portion of which is provided with a curvilinear cutting edge, a pole on which said mouth-piece is mounted at one end, a knife having a cutting edge pivotally mounted in a flatwise manner upon said mouth-piece with the edge thereof directed toward said opening and said curvilinear edge, and means connected to said blade whereby to operate it across said opening from the opposite end of said pole.

7. In a fruit clipping device, a sack having a netting section, a mouth-piece for said sack comprising a flat ring-like steel plate having a circular opening lying superjacent the opening of said sack and a tangential segment extending off to one side of the ring-like part in the plane thereof, a portion of said opening being beveled to provide a curvilinear cutting edge, spaced downwardly inturned parts in the outer periphery of said mouth-piece for fastening said sack thereto, a pole, said segment having a downwardly directed polygonal flange, connected to said pole with said circular opening resting in a slightly pitched horizontal plane, with said netting section directed to the side of the device from which a workman operates, a knife pivotally mounted upon said tangential segment of said mouth-piece with the edge thereof directed toward said circular opening, and means for operating said knife forwardly and backwardly across said opening.

8. The subject matter of claim 7 and, said knife having a straight edge cutting portion and during the forward travel thereof across said opening being adapted to perform a slicing action on the stem of the fruit being severed incident to the final cutting clinch of both cutting edges of said cutting elements with said stem.

9. In a device of the kind described, a sack, a mouth-piece for said sack, said mouth-piece comprising a flat ring-like plate having a circular opening extending therethrough, a pole on which said mouth-piece is mounted at one end, a knife having a cutting edge pivotally mounted in a flatwise manner upon said mouth-piece with the edge thereof directed toward said opening, and means connected to said blade for operating it across said opening from the opposite end of said pole.

PETER METZGER.